United States Patent
Kulkarni et al.

(10) Patent No.: US 6,310,630 B1
(45) Date of Patent: Oct. 30, 2001

(54) DATA PROCESSING SYSTEM AND METHOD FOR INTERNET BROWSER HISTORY GENERATION

(75) Inventors: Salil Janardan Kulkarni, Chicago, IL (US); Merle Douglas Sterling, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/989,675

(22) Filed: Dec. 12, 1997

(51) Int. Cl.$^7$ .................................................. G06F 3/00
(52) U.S. Cl. .................... 345/776; 345/357; 345/356; 707/501; 709/201; 709/203; 709/218
(58) Field of Search ....................... 345/357, 350, 345/349, 356, 329; 707/501; 395/200.49, 200.48, 200.33, 200.31

(56) References Cited

U.S. PATENT DOCUMENTS

| | | | |
|---|---|---|---|
| 5,500,929 | * | 3/1996 | Dickinson .......................... 345/356 |
| 5,588,109 | | 12/1996 | Dickinson et al. .................. 345/326 |
| 5,673,322 | * | 9/1997 | Pepe et al. ............................ 380/49 |
| 5,712,979 | * | 1/1998 | Graber et al. ................... 395/200.54 |
| 5,727,129 | * | 3/1998 | Barrett et al. .......................... 395/12 |
| 5,778,367 | * | 7/1998 | Wesinger, Jr. et al. ............... 707/10 |
| 5,801,702 | * | 9/1998 | Dolan et al. ......................... 345/357 |
| 5,802,516 | * | 9/1998 | Shwarts et al. ......................... 707/6 |
| 5,809,250 | * | 9/1998 | Kisor ................................ 395/200.57 |
| 6,018,344 | * | 1/2000 | Harada et al. ....................... 345/357 |
| 6,037,935 | * | 3/2000 | Bates et al. .......................... 345/335 |

* cited by examiner

Primary Examiner—Raymond J. Bayerl
Assistant Examiner—Cuong T. Thai
(74) Attorney, Agent, or Firm—Barry S. Newberger; Winstead Sechrest & Minick P.C.; Jeffrey S. LaBaw (57) ABSTRACT

A data processing system and method for generating browsing histories during a worldwide web browsing session is implemented. As web pages are visited, they are added to the browsing history so generated which is organized in inverse chronological order. Each web page is further grouped with the server which provided the web page in order to facilitate subsequent random access to web pages that have been previously visited. Each visited web page, and each server associated therewith, appears in the history only once. In this way, the browsing history remains manageable, and user access to previously visited websites is simplified.

48 Claims, 5 Drawing Sheets

DATA PROCESSING SYSTEM AND METHOD FOR INTERNET BROWSER HISTORY GENERATION

TECHNICAL FIELD

The present invention relates in general to a data processing system and, more particularly, to the generation and organization of Internet web page data.

BACKGROUND INFORMATION

The worldwide network of computers commonly known as the "Internet" has seen explosive growth in the last several years. This growth has been typically fueled by the introduction and widespread use of "web" browsers that allow for simple graphical user interface-based access to network servers. Such network servers typically support documents formatted as "web pages." The "World Wide Web" (WWW) is a hypertext information and communication system used on the Internet with data communications operating according to a client/server model using a Hypertext Transfer Protocol (HTTP). HTTP is a known application protocol that provides users access to files using a standard page description language referred to as Hypertext Markup Language (HTML). It should be noted that HTML is an application of Standard Generalized Markup Language (SGML), an international standard (ISO 8879) for text information processing. Furthermore, the files that are accessed using HTML may be provided in different formats, such as text, graphics, images, sound, and video, among others. HTML provides basic document formatting and allows the developer to specify "links" to other servers and files. Links are then specified using a Uniform Resource Locator (URL) when an HTML-compliant client browser is used. Upon specification of a URL, a client may make a TCP/IP request to the server identified in the link and receive a "web page" in return, where the "web page" is a document formatted according to HTML.

Links are important tools that may be interactively used within a web page. Links, which may be highlighted text, pictures, or icons, point to a different area on the same web page, a different web page, or some other resource on the Internet. By accessing a URL associated with a link, a user may travel from web page to web page. Successive web pages may be either on the same server as the linking page, or on a different server. It should be noted that links are typically accessed by a user using a traditional "point and click" methodology.

If a user clicks on a link, the browser may then transfer the user from the current document to another document associated with the link. In turn, the destination document may contain additional links that go to yet more documents. In this manner, the user may navigate through multiple hierarchical layers of documents or various sites by continuing to select links.

As users navigate among documents and sites, most browsers track this activity using a linear history mechanism. The pages visited are simply added to a linear list. The current page is at the top of the list, and pages appear in inverse chronological order thereafter. Subsequently visited pages are added to the top of the list. This includes pages that have been previously visited and which the user has revisited. Thus, in a particular session, the linear history may contain multiple references to the same web page. These multiple references are not necessarily useful to the user, and increase the burden of revisiting the web page that has been pushed down the list by the repeated entries. The list may eventually become unwieldy, or if the list is limited in length, become limited in usefulness, because it largely contains redundant information. Thus, there is a need in the art for an improved method and apparatus for maintaining browsing histories in which redundant information is excluded, and which provide random access to any page previously retrieved.

SUMMARY OF THE INVENTION

The previously mentioned needs are addressed by the present invention. In a first form, a method of generating browsing histories is implemented in which a current server is identified, and it is determined whether a data record associated with the server exists in a list of such data records. If no data record exists, a new data record associated with the current server is added to the list. Each data record in the list includes a list of web page identifiers corresponding to the web pages visited on the server. If the current page's identifier is not in the list of identifiers, it is added to the list. In another embodiment, each web page identifier list includes a portion containing the contents of the corresponding web page. In yet another embodiment, each web page identifier list includes a portion containing a sorting value whereby ordering of the web page identifier list may be effected.

In a second form of the present invention, a data processing system is provided. The data processing system includes circuitry for determining if a current server corresponds to a data record in a list of server associated data records. The data processing system has circuitry for adding such a data record wherein each data record includes a portion including a list of web page identifiers. Circuitry for incorporating the current web page's identifier into the list of identifiers is included in the data processing system of the present invention. If the identifier is in the list, the circuitry does not add it to the list. In another embodiment, the data processing system of the present invention has circuitry for including a sorting value in a portion of each identifier list, and also includes circuitry for ordering the identifier list using the sorting values.

There is also provided a machine readable program storage device embodying program instructions for generating a browsing history. The program instructions include programming for determining if a current server has a corresponding data record in a list of data records associated with web servers, and programming to add a data record associated with the current server, if no such data record exists. Programming for adding a web page identifier of the current web page to a list of such identifiers included in the data record is also contained in the machine readable program of the present invention. Before adding a web page identifier to the list, the program determines if the identifier already appears in the list, and bypasses the program instructions for adding a page identifier if the identifier so appears. In another embodiment, the machine readable program of the present invention includes programming for incorporating a sorting value in a portion of the web page identifier, and programming to order the web page identifier list according to the sorting value. In yet another embodiment, the program has programming for adding the contents of the web page corresponding to the web page identifier in another portion of the web page identifier list.

The foregoing has outlined rather broadly the features and technical advantages of the present invention in order that the detailed description of the invention that follows may be better understood. Additional features and advantages of the invention will be described hereinafter which form the subject of the claims of the invention.

These and other features, and advantages, will be more clearly understood from the following detailed description taken in conjunction with the accompanying drawings. It is important to note the drawings are not intended to represent the only form of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

The present invention provides a data processing system and method for creating a browsing history during a new browsing session. In an embodiment of the present invention, a browsing history may be created in conjunction with a current browser, such as Netscape™ or Internet Explorer™. Alternatively, an embodiment of the present invention may be incorporated in a new browser. A more detailed description of the implementation of the present invention will subsequently be provided. Prior to that discussion, an environment in which the present invention may be implemented will be described in greater detail.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Figure 1:
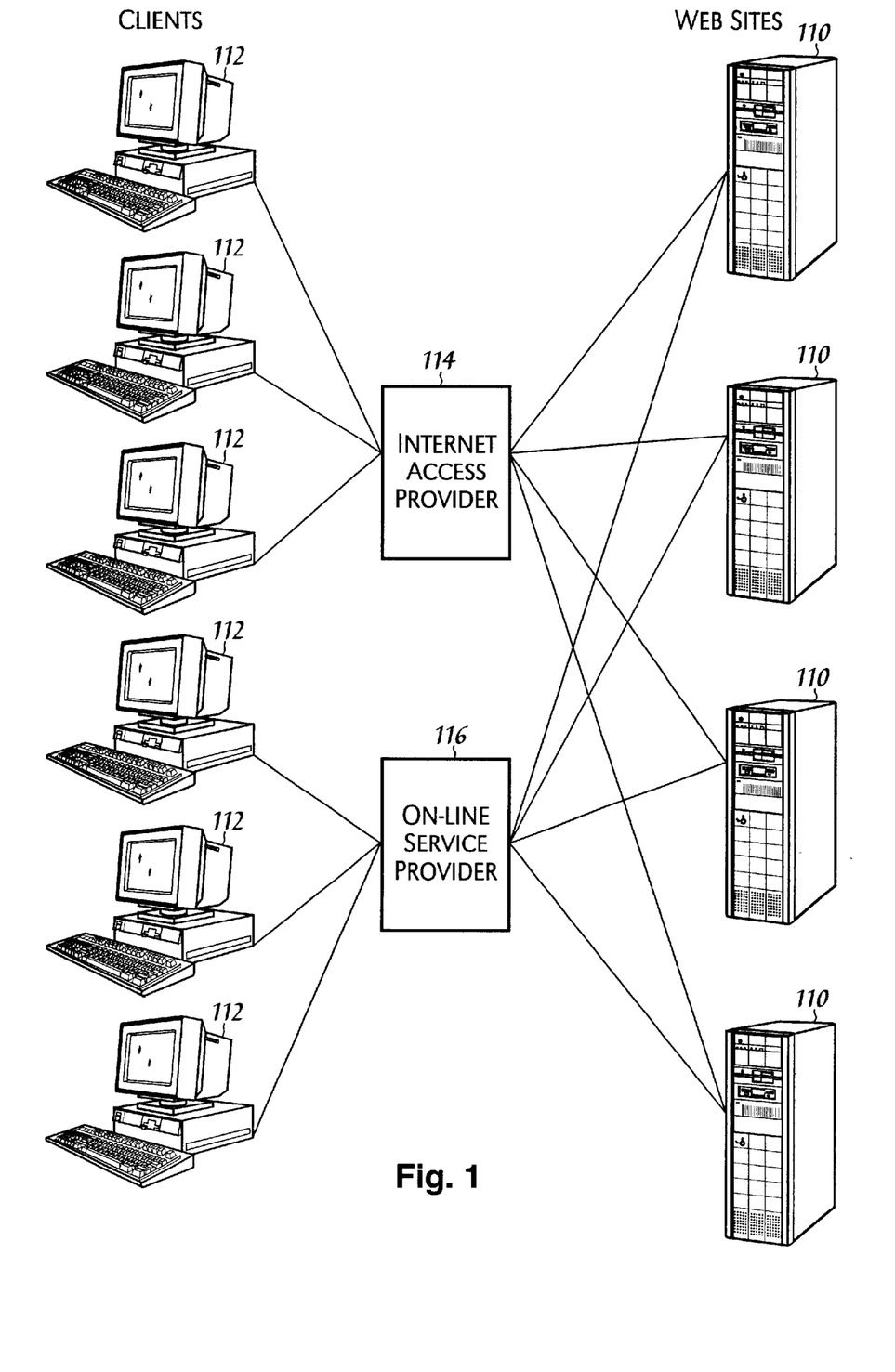
FIG. 1 illustrates, in block diagram form, a communication system in accordance with one embodiment of the present invention.

FIG. 1 illustrates a communication network based on a client-server model typically utilized in the Internet. The subsequent discussion and description of FIG. 1 are provided to illustrate the Internet environment utilized by the present invention.

Conceptually, the Internet comprises a large network of "servers" 110 that are accessible by "clients" 112. Each of the plurality of clients 112 is typically a user of a personal computer. Clients 112 access the Internet through some private Internet access provider 114 (such as Internet America™) or an on-line service provider 116 (such as America On-Line™, AT&T WorldNet™, and the like). Each of clients 112 may run on a "browser," which is a known software tool used to access the servers (110) via the access providers (114 and 116). Each server 110 selectively operates a "web site" that supports files in the form of documents and pages. A network path to a server is identified by a uniform resource locator (URL) having a known syntax for defining a network connection.

As previously mentioned, the World Wide Web is a collection of servers on the Internet that utilizes Hyper Text Transfer Protocol (HTTP). HTTP is a known application protocol that provides users access to files using a standard page description language known as Hyper Text MarkUp Language (HTML). It should be noted that the files may be in different formats, such as text, graphics, images, sound, video, and the like. HTML provides basic document formatting and allows the developer to specify "links" to other servers or files. Use of an HTML-compliant browser involves specification of a link via the URL. Upon such specification, one of the clients 112 may make TCP/IP request to one of plurality of servers 110 identified in the link and receive a web page (specifically, a document formatted according to HTML) in return.

Figure 2:
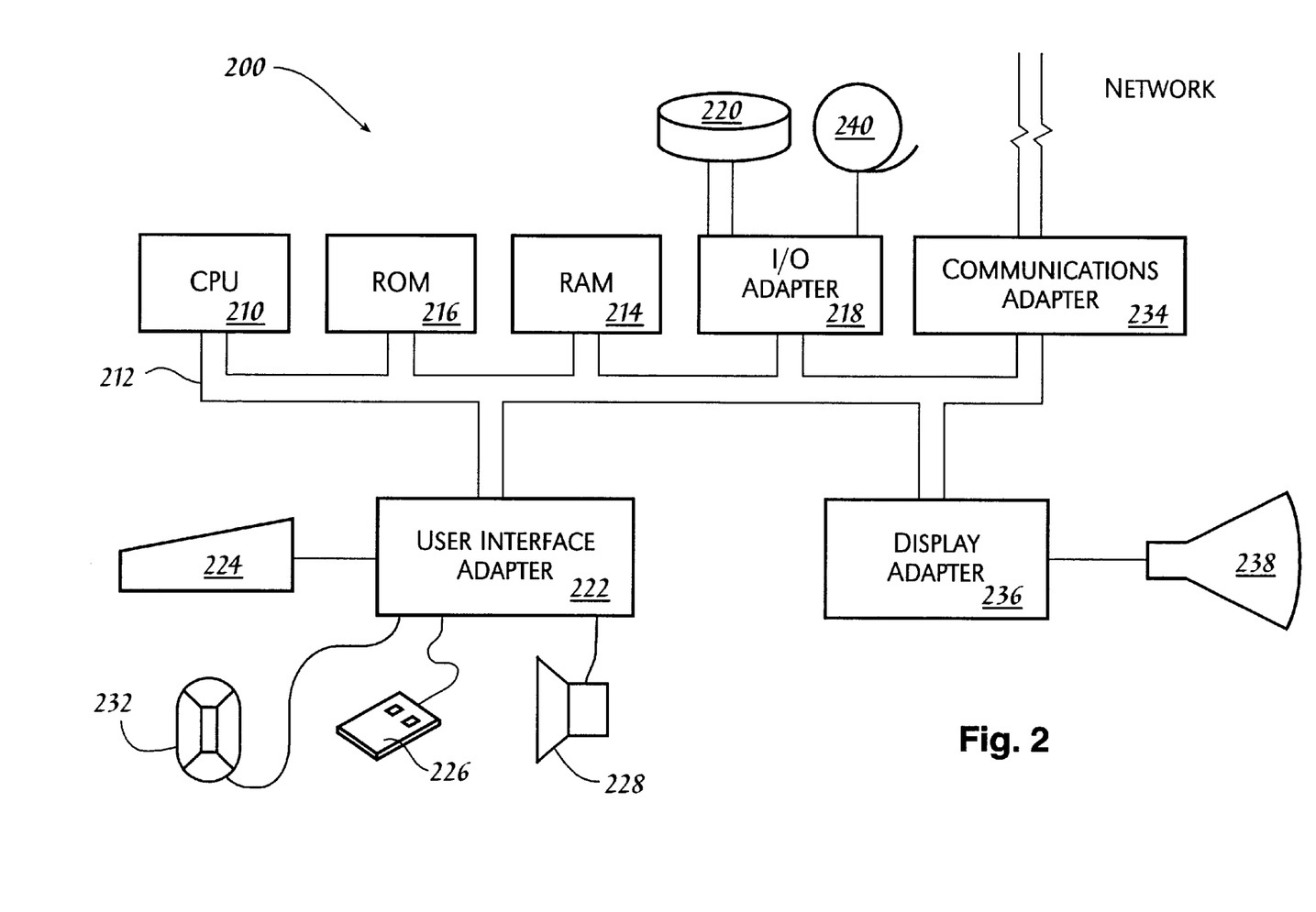
FIG. 2 illustrates, in block diagram form, a data processing system implemented in accordance with one embodiment of the present invention.

FIG. 2 illustrates a data processor 200 that may be utilized to implement a "client" (112) that executes the methodology of the present invention. Data processing system 200 comprises a central processing unit (CPU) 210, such as a microprocessor. CPU 210 is coupled to various other components via System bus 212. Read-only memory (ROM) 216 is coupled to the System bus 212 and includes a basic input/output system (BIOS) that controls certain basic functions of the data processing system 200. Random access memory (RAM) 214, I/O adapter 218, and communications adapter 234 are also coupled to System bus 212. I/O 218 may be a small computer system interface (SCSI) adapter that communicates with a disk storage device 220. Communications adapter 234 interconnects bus 212 with an outside network enabling the data processing system to communicate with other such systems. Input/output devices are also connected to System bus 212 via user interface adapter 222 and display adapter 236. Keyboard 224, trackball 232, mouse 226, and speaker 228 are all interconnected to bus 212 via user interface adapter 222. Display monitor 238 is coupled to system bus 212 by display adapter 236. In this manner, a user is capable of inputting to the system through keyboard 224, trackball 232, or mouse 226, and receiving output from the system via speaker 228 and display 238.

Some embodiments of the invention include implementations as a computer system program to execute the method or methods described herein, and as a computer program product. According to the computer system implementation, sets of instructions for executing the method or methods are resident in RAM 214 of one or more computer systems configured generally as described above. Until required by the computer system, the set of instructions may be stored as a computer program product in another computer memory. For example, in disk drive 220 (which may include a removable memory such as an optical disk or floppy disk for eventual use in disk drive 220).

Further, the computer program product can also be stored at another computer and transmitted in a computer readable medium when desired to the user's work station by a network or by an external network such as the Internet. One skilled in the art would appreciate that the physical storage of the sets of instructions physically changes the medium upon which it is stored so that the medium carries computer-readable information. The change may be electrical, magnetic, chemical, or some other physical change. While it is convenient to describe the invention in terms of instructions, symbols, characters, or the like, the reader should remember that all of these and similar terms should be associated with the appropriate physical elements.

Note that the invention describes terms such as comparing, validating, selecting, entering, or other terms that could be associated with the human operator. However, at least for a number of the operations described herein which form a part of the present invention, no action by a human operator is desirable. The operations described are, in large pat machine operations processing electrical signals to generate other electrical signals.

The foregoing has provided a general description of a communication environment that implements one embodiment of the present invention. Execution and operation of the present invention will subsequently be described in greater detail with respect to each of FIGS. 1 through 3. As previously mentioned, the data processing system of the present invention generates a web-browsing history. The web-browsing history so generated voids duplication of repeatedly visited sites, and allows for random access to previously visited web pages. A description of operation of the data processing system and methodology of the present invention will now be provided in greater detail.

Figure 3:
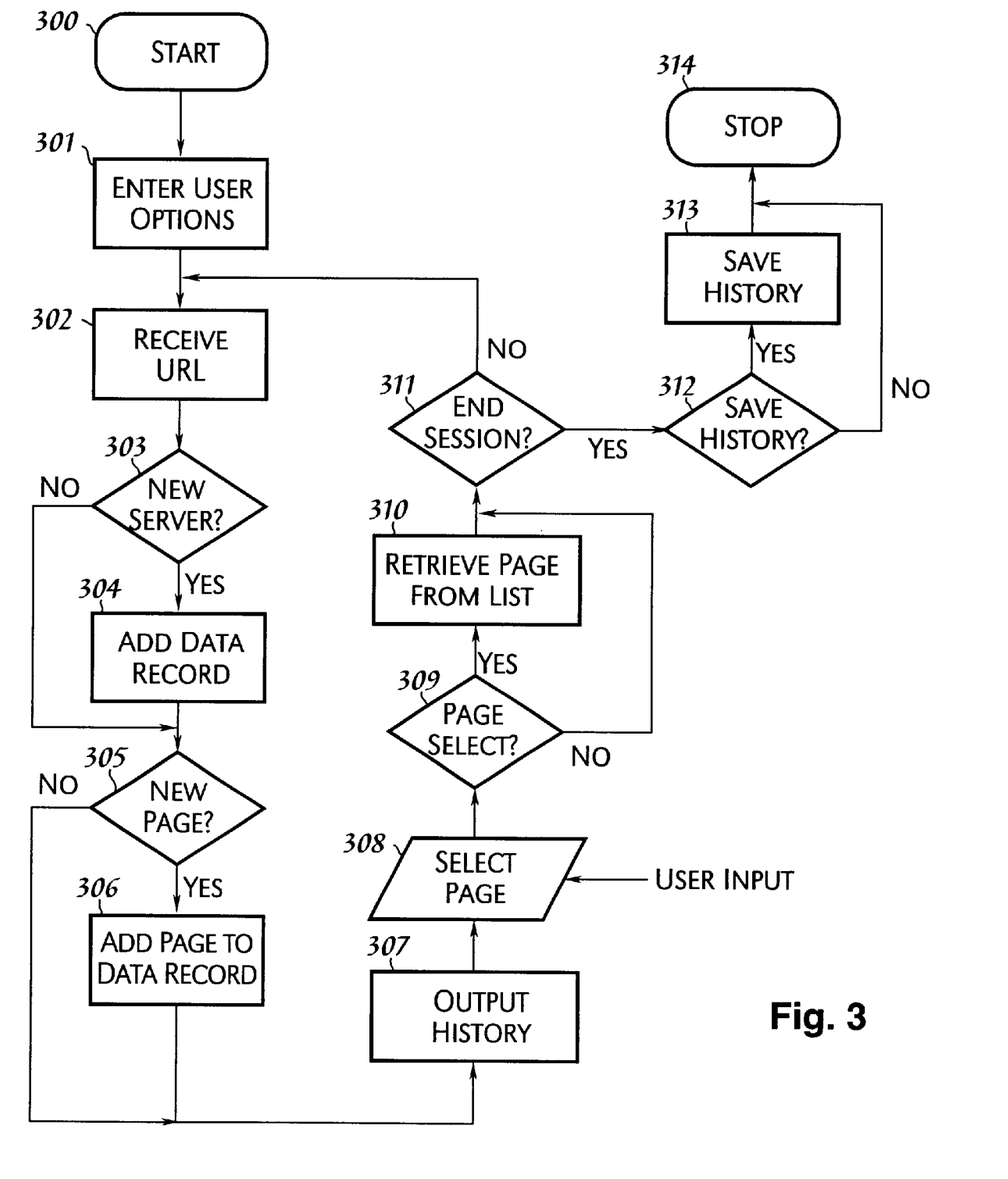
FIG. 3 illustrates, in flowchart form, a methodology implemented to generate a web browsing history in accordance with an embodiment of the present invention.

Refer now to FIG. 3. The process of the present invention is initiated in step 300. In an embodiment in which the present invention is incorporated into a new browser, the initiation step, 300, occurs during launch of the browser. Alternatively, if the methodology of the present invention is embodied in a free-standing application program, step 300 is associated with the launch of that application. In step 301, user options related to saving the browser history generated by the present invention are entered. Step 301 may incorporate preselected default values for these options. In step 302, the URL identifying the current web page is received. In an embodiment of the present invention as a free-standing application, wherein a current browser, such as Netscape™ or Internet Explorer™ performs the browsing function, the URL is received through an interapplication communication. Interapplication communication services are known in the art. For example, within both the Windows™ and OS/2® environments, dynamic data exchange (DDE) is one such method. DDE is a message protocol for data exchange between applications programs under Windows™ or OS/2®. Alternatively, in an embodiment of the present invention incorporated into a new browser, the URL of the present web page is already known to the browser, and is simply retrieved from the appropriate memory location within the browser's memory space within random access memory 214. The URL contains a portion that identifies the current server on which the current web page resides. If the current server is a new server, step 303, it should be added to the browsing history. In step 303, it is determined whether the current server is a new server. The portion of the URL identifying the current server is compared with a portion of a data record that contains the server identity portions of a URL. Each data record associated with a new server is maintained in a list of such data records. If the portion of the URL identifying the current server does not appear in the list of data records, then the current server is a new server. Then a new data record associated with the current server must be generated and added to the list, step 304. Data records included in the list may be stored in RAM 214.

In an embodiment of the present invention, the browsing history might be graphically displayed, for example on display 238, as a sequence of file tabs, such as a card index, or a notebook file tab. In such a graphical representation, each data record associated with a server might be depicted as a major index tab. Hence, for illustrative purposes only, and as a mnemonic device, the step of adding a new data record associated with a previously unvisited server is referred to as adding a major tab. If a server has been previously visited, then the browsing history contains a data record associated with that server and the step of adding a major tab, step 304, is bypassed.

Each data record associated with a server contains a portion including a list of web pages received from the server. Each entry in the list may contain the entire contents of the web page. Alternatively, each entry may contain a proxy to the web page contents. For example, the contents may be stored as a file on a mass storage medium, such as disk storage device 220. Then a list entry might contain a pointer to the file. The pointer may then be used to retrieve the page contents. Hereinafter, the page contents themselves or a proxy thereof collectively will be referred to as a page contents reference.

In step 305, it is determined if the current web page already exists in the list of web pages associated with the current server. If it does not, the web page is added to the list, step 306. For illustrative purposes only, this has similarly been described as adding a minor tab. In an embodiment of the present invention in which the browsing history is graphically displayed, for example, on display 238, each web page in the list associated with each server might be depicted as a minor file tab within a card index, or a notebook, in which each server is associated with a major tab, as previously described. Although such a depiction is usefull as a mnemonic device for the user, it would be understood by a person of ordinary skill in the art that such a depiction is not essential to the present invention, and the step of adding a web page to a list of web pages contained within a data record associated with a server does not depend on such a depiction. If the current page already exists within the list of web pages contained in the data record associated with the present server, the step of adding a minor tab, step 306, is bypassed. In this way, redundant history entries are eliminated.

In step 307, the browsing history is outputted. The history may be outputted in inverse chronological order in an embodiment of the present invention. Thus, in such an embodiment, within the history, the present page appears first. Then, the pages previously visited appear in the inverse order in which they were visited. In an embodiment of the present invention, outputting the browsing history in inverse chronological order, the ordering may be effected by incorporating a date-time stamp portion in each list entry portion of the data record. Alternatively, each web page entry in the list portion of a data record might include an index portion which is updated whenever the web page is revisited.

In step 308, the user may select a previously visited web page contained in the browsing history for redisplay. In an embodiment of the present invention, the user input of a page selection may be via a graphical user interface (GUI) presented on display 238, and effected by actuating a switch, that is, a "mouse click," on mouse 226. The mouse click is handled by the operating system providing the basic functions, including the application program interface (API), in data processing system 200. The user selection is then passed by the operating system to the process of the present invention, in step 308. If a page selection has occurred, step 309, the page is retrieved from the list in step 310. Otherwise, the current web page remains displayed. Such a GUI will subsequently be further described.

The browsing history continues to receive URLs, step 302, provided the browsing session does not terminate in step 311. In an embodiment of the present invention in a free-standing application, the termination of the associated browser may cause termination of the generation of a browsing history. In such a case, termination of the browser may signal termination of the generation of the browsing history through an interapplication communication. However, an embodiment of the present invention need not terminate when the browser terminates. In such an embodiment, the browsing history remains outputted, although no new sites or pages are added because browsing has ended. Alternatively, if browsing history generation is incorporated in a new browser, then the browsing history generation terminates with the termination of the browser itself.

If the session terminates, then it must be determined whether to save the browsing history, step 312. If the history is to be saved, the data to be saved is determined by the user options entered in step 301. Depending on the user option entered, or the preselected default, the saved data may alternatively be the URLs of the pages contained in the history, or, alternatively, the entire contents of each page may be saved. If the former option is chosen, when the history is reopened, the browser will retrieve the latest pages saved from the server identified in the URL. In the latter case, the contents of the page will be retrieved from the saved history. Retrieval is effected using the page contents reference, as described hereinabove. In yet another user selected alternative, the present invention may be configured to signal the browser to only add pages if they have changed since being added to the history. In step 313, the data representing the history to be saved is written to a file which may be stored on disk storage device 220. The process then terminates, step 314. If the history is not to be saved, the step of writing the history data to a file, step 313 is bypassed, and the process terminates, step 314.

Figure 4:
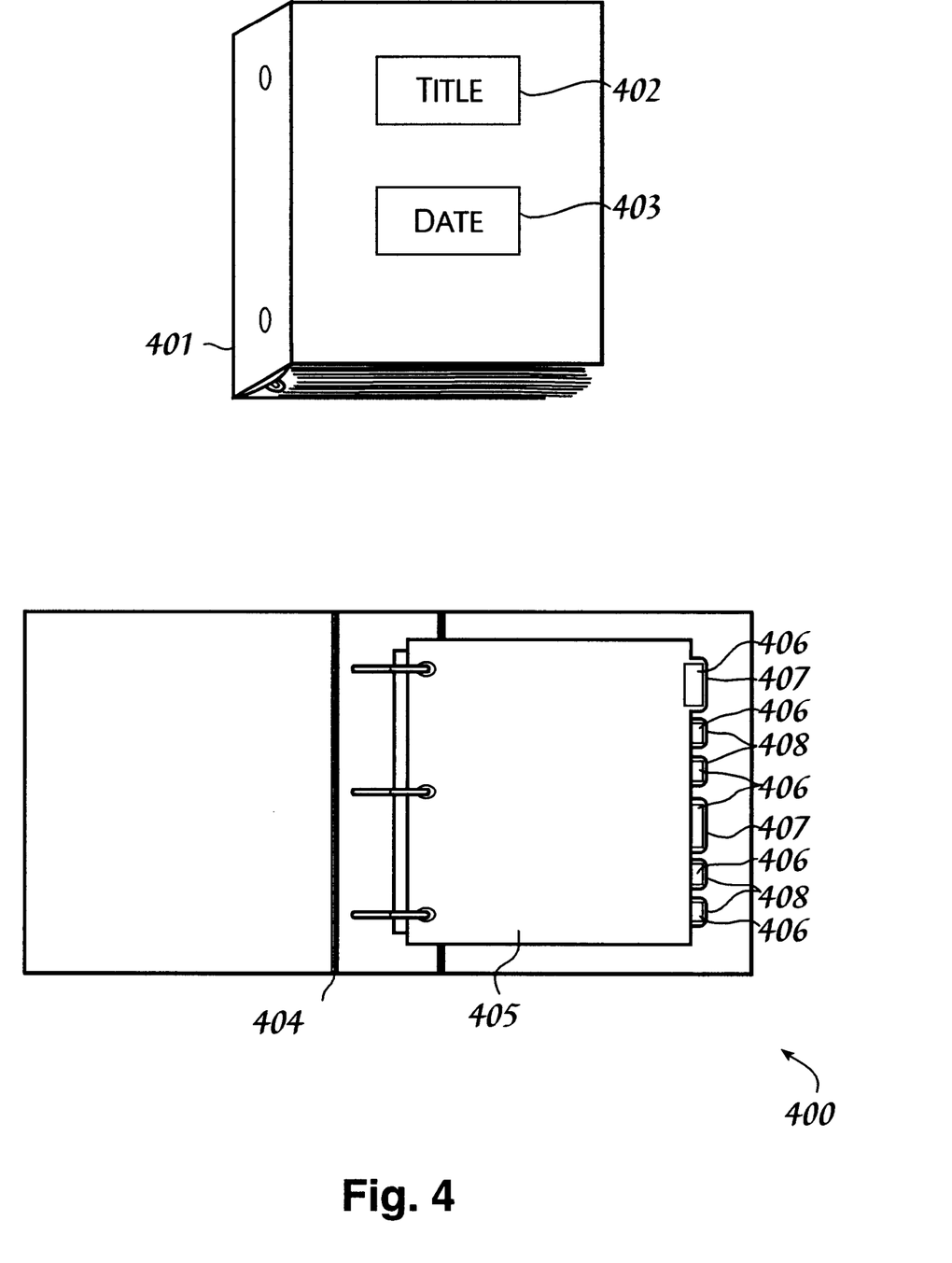
FIG. 4 depicts a graphical user interface in accordance with an embodiment of the present invention.

As previously discussed, an embodiment of the present invention may output, in step 307, a browsing history in GUI form. Refer now to FIG. 4 in which one such embodiment is illustrated.

GUI 400 may include a graphic of a closed notebook 401 representing the browsing history. Because browsing histories may be saved between browsing sessions, a user enterable text field having a session title, 402, may be included. Similarly, notebook 401 includes a date field, 403, in which the date of a browsing session is displayed. The date may be automatically entered by the data processing system, such as data processing system 200. Moreover, in an embodiment of the present invention, a date option may be selected as a user option, such as in step 301, whereby the date displayed may be chosen to be a creation date of notebook 401 or a date of a last modification thereto.

The graphic of a closed notebook 401 may be adaptable for "iconization" in an embodiment of the present invention. In such an embodiment, the closed notebook graphic 401 appears on display screen, for example, display monitor 238, even when a browsing session is not currently being executed. In GUI based operating systems, icons are usually displayed as small figures, that is, small in relation to the display itself, on the display monitor. The icon serves to represent an application or other software. By mouse "clicking" on an ionized notebook 401, a browsing session may be launched. As previously described, "mouse clicks" are handled by the operating system which then causes a session to be launched, such as by executing step 300 in FIG. 3.

Figure 5:
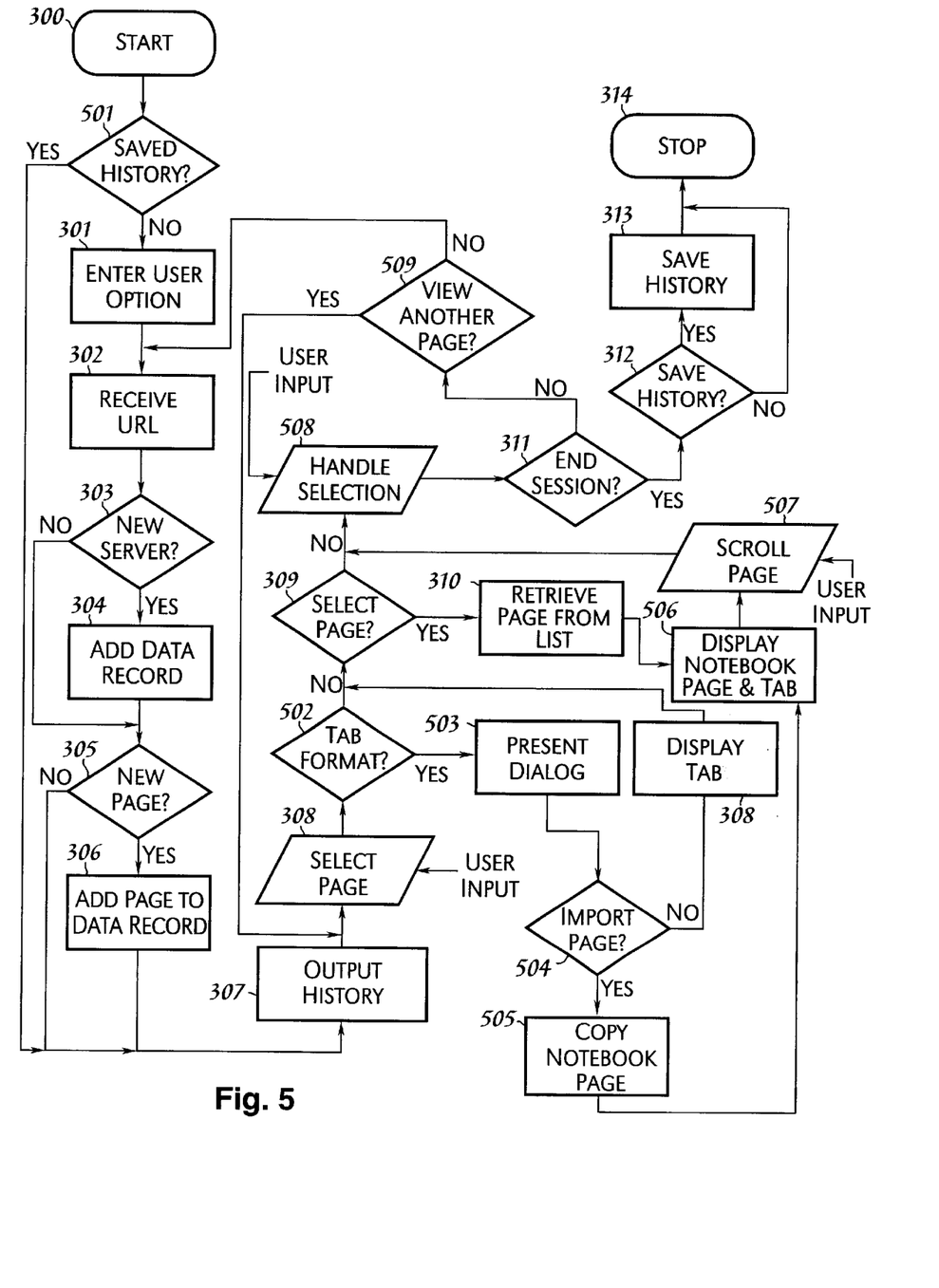
FIG. 5 illustrates, in flow chart form, a methodology implemented to generate a web browsing history in accordance with an alternative embodiment of the present invention.

Refer now to FIG. 5 in which a flow diagram of process 500 implementing an alternative embodiment of the present invention is depicted. This embodiment may be adapted to an ionized GUI. In step 501, it is determined if the browsing history is a saved history from a previous browsing session. If not, user options are entered, step 301, as before. Then web pages are added to the browsing history in steps 302–306, as described hereinabove.

If the browsing history is a saved history, user options have already been set, and the history is immediately outputted, step 307. The user can then begin browsing by making a selection from the displayed history, step 308. The displayed history may be in the form of a GUI, such as open notebook 404 in FIG. 4.

Open notebook 404 displays a plurality of tabs 405. A user may return to a site in the browsing history by selecting the corresponding tab, as in step 308, previously discussed. Tabs 405 include a field 406 for displaying information about the server or page depending on whether the tab is a major tab, 407, or minor tab, 408, respectively. Field 406 may incorporate textual information about the server or page, such as its URL or other text chosen by the user. It may also depict graphical information which may also be selected by the user or a "miniaturized" version of the corresponding web page.

The user may elect to format a tab in step 308. If the user chooses to format a tab, step 502, a graphical display, usually called a "dialog," in step 503, may be presented to the user to enable him to enter text, or select a graphical image, to be displayed in field 406 of the selected tab. The dialog information is handled by the operating system providing the basic functions in the data processing system, such as data processing system 200. If the user is not importing the page, step 504, to be discussed subsequently, the information is then passed by the operating system to process 500 of the present invention for display, in step 308, of the selected text or graphic in field 406. If a page is selected, the user selection is then passed at step 309 of that process, and the information retrieved at step 310. The information is passed to the first process 500 by the operating system dialog handling methodology.

A main portion of the notebook page may display the contents of the associated web page, step 506. The displayed contents are contained in the contents portion of the web page list in the data record corresponding to the major tab, as described hereinabove. If the contents are too extensive to be displayed in their entirety, the page may be scrolled in response to user input, step 507. Scrolling is a known technique in the art The user then may choose to sequentially page through the notebook, or terminate a session, in step 508. If the session is not terminated, the user may elect to view another page, step 509. Terminating a session is subsequently discussed.

Alternatively, the user may choose, via the dialog, to import an entire tab from another notebook. In which case, the second notebook would be opened by launching another Process of the present invention associated with the new notebook. This process may be process 500. If the user chooses this option, in step 504, the contents of the data record represented by the tab in the second notebook is copied in the first, step 505, by creating a new data record in the first list of data records which the first notebook GUI represents and inserting the contents of the copied data record into it. Copying may entail invoking operating system routines provided in the API. For example, copying might be to a first "clipboard" region reserved in RAM by tee opening system, from which the data is then retrieved. Other means would be well known to one of ordinary skill in the art. A new tab resting the added data record is also created in the first notebook GUI. The new notebook page and tab are displayed in step 506. By copying notebook pages in this way, a user may, for example, create a set of notebooks organized by subject or other desired criteria.

When the session ends, step 311, the notebook GUI is closed. The command to end a notebook session may be signalled by an associated browser, as previously described, or may be by user input, step 508. User input may be by mouse click or a keyboard entry, such as from keyboard 224. These signals are typically processed by the API, as discussed hereinabove, and passed to process 500 in step 507.

Although the steps of formatting notebook tabs, importing pages, and sequentially viewing notebook pages, steps 502–509 have been described in association with the present invention as embodied in process 500, such an association is not necessary. These process steps may be incorporated in other embodiments of the present invention, including that illustrated in FIG. 3.

It should be noted that the description provided herein is but one example of an implementation of the present invention. It should be noted that many additional implementations may also be utilized to realize the present invention.

While there have been described herein the principles of the invention, it is to be clearly understood to those skilled in the art that this description is made by way of example only and not as a limitation to the scope of the invention. Accordingly, it is intended, by the appended claims, to cover all modifications of the invention which fall within the true spirit and scope of the invention.

What is claimed is:

1. In a data processing system, a method of generating a web browsing history comprising the step of adding a data record corresponding to a current server identified in a web page identification data to a list of data records, if said list of data records has no data record corresponding to said current server, said data record including a server identification portion containing an identifier of a corresponding server, and a web page identifier list portion.

2. The method of claim 1 further comprising the step of adding a web page identifier of a curt web page to said web page identifier list portion of said current server's data record if said web page identifier of said current web page is not included in said identifier list, and wherein said data record list forms said web browsing history.

3. The method of claim 2 further comprising the step of incorporating a web page contents reference in said web page identifier list portion if said web page identifier is not included in said identifier list portion.

4. The method of claim 1 further comprising the step of:
outputting said list of data records.

5. The method of claim 4 wherein said step of outputting said list of data records comprises displaying said list of data records on a display monitor.

6. The method of claim 1 further comprising:
the step of storing said list of data records in a computer readable storage medium, said step of storing said list of data records including storing web page contents when said web page contents reference is a web page contents proxy.

7. The method of claim 1 wherein said web page identification data is a uniform resource locator (URL).

8. A method of generating a web browsing history comprising the step of adding a data record corresponding to a current server identified in a web page identification data to a list of data records, if said list of data records has no data record corresponding to said current server, said data record including a server identification portion containing an identifier of a corresponding server, and a web page identifier list portion;
outputting said list of data records;
wherein said step of outputting said list of data records comprises displaying said list of data records on a display monitor; and
formatting one or more tabs in a graphical user interface (GUI), wherein said GUI is a notebook displaying said tabs, said tab further comprising one or more major tabs and one or more minor tabs, each major tab representing a member of said list of data records, and each said minor tab representing an entry in said list of web page identifiers within each said data record.

9. A data processing system for generating a web browsing history, said data processing system comprising circuitry operable for adding a data record corresponding to a current server into a data record list if said data record list does not contain a data record corresponding to said current server.

10. The data processing system of claim 9 further comprising circuitry operable for adding a web page identifier of a current web page to a web page identifier list portion of data record if said current web page identifier is not contained in said web page identifier list, and wherein said list of data records forms said browsing history.

11. The data processing system of claim 10 further comprising:
circuitry for incorporating a web page contents reference in a web page contents portion of said web page identifier list.

12. The data processing system of claim 9 further comprising circuitry for outputting said list of data records.

13. The data processing system of claim 12 wherein said circuitry for outputting said list of data records includes a display monitor.

14. The data processing system of claim 9 further comprising:
circuitry for storing said list of data records in a computer readable storage medium, said circuitry being operable for storing web page contents when said web page contents reference is a web page contents proxy.

15. A data processing system for generating a web browsing history, said data processing system comprising:
circuitry operable for adding a data record corresponding to a current server into a data record list if said data record list does not contain a data record corresponding to said current server;
circuitry for outputting said list of data records, wherein said circuitry for outputting said list of data records includes a display monitor; and
circuitry for formatting one or more tabs in a graphical user interface (GUI), wherein said GUI is a notebook displaying said tabs, said tabs further comprising one or more major tabs and one or more minor tabs, each major tab representing a member of said list of data records, and each said minor tab representing an entry in said list of web page identifiers within each said data record.

16. A program product in a computer readable medium for generating a browsing history, said program product comprising:

programming for determining if a current server identified in a current web page identifier is in a data record in a list of data records, each identified server being associated with a data record in said list; and programing for incorporating a server identifier of said current server in a data record added to said list of data records if said identified server is not in a data record in said list of data records.

17. The program product in a computer readable medium of claim 16 further comprising programming for adding a web page identifier to a web page identifier list in said associated data record if a current web page identifier is not in said web page identifier list.

18. The program product in a computer readable medium of claim 17 further comprising:

programming for incorporating a web page contents reference of a current web page in a web page contents portion of said web page identifier list if said current web page identifier is not in said web page identifier list.

19. The program product in a computer readable medium of claim 16 further comprising programming for outputting said list of data records.

20. The program product in a computer readable medium of claim 16 further comprising programming for storing said list of data records on a computer readable medium of storage, said programming including programming for storing web page contents when said web page contents reference is a web page contents proxy.

21. A program product in a computer readable medium for generating a browsing history, said program product comprising:

programming for determining if a current server identified in a current web page identifier is in a data record in a list of data records, each identified server being associated with a data record in said list;

programming for incorporating a server identifier of said current server in a data record added to said list of data records if said identified server is not in a data record in said list of data records; and programming for outputting said list of data records, wherein said programming for outputting said list of data records includes programming for displaying said list of data records on a display monitor, said programming for displaying said list of data records further comprising programming for formatting one or more tabs in a graphical user interface (GUI), wherein said GUI is a notebook displaying said tabs, said tabs further comprising one or more major tabs and one or more minor tabs, each major tab representing a member of said list of data records, and each said minor tab representing an entry in said list of web page identifiers within each said data record.

22. A method for generating a web browsing history comprising the steps of:

for each web page browsed, creating a notebook page for inclusion in a notebook data structure, wherein a main portion of the notebook page contains content from the web page and a tab portion of the notebook page contains a synoptic representation of the web page contents;

ordering the created notebook pages according to an ordering rule based on the web browsing history; and presenting a notebook for a web browsing session wherein a plurality of tab portions and at least one main portion are displayed.

23. The method of claim 22 wherein the synoptic representation displayed in the tab portion of a respective notebook page is user selectable.

24. The method of claim 22 further comprising the steps of:

detecting a command to close the notebook; and presenting the notebook in ionized form to represent a web browsing session.

25. The method of claim 22 further comprising the steps of:

detecting a mouse event selecting a tab portion of the notebook; and retrieving a web page associated with the selected tab portion.

26. The method of claim 22 wherein the ordering rule is related to a sequence in which the web pages are browsed in the web browsing session.

27. The method of claim 22 further comprising the step of importing a notebook page from another notebook representing a different web browsing session.

28. The method of claim 22 further comprising the step of sequentially activating the tab portions of the notebook page so that a prior web browsing session is presented without retrieving the web page content with a new set of requests to web servers.

29. The method of claim 22 further comprising the step of scrolling the main portion of a notebook page in response to user input.

30. The method of claim 22 wherein a set of subject-related notebooks are created, each containing a set of web pages for a particular subject.

31. A data processing system for generating a web browsing history comprising:

for each web page browse, circuitry for creating a notebook page for inclusion in a notebook data structure, wherein a main portion of the notebook page contains content from the web page and a tab portion of the notebook page contains a synoptic representation of the web page contents;

circuitry for ordering the created notebook pages according to an ordering rule based on the web browsing history; and circuitry for presenting a notebook for a web browsing session wherein a plurality of tab portions and at least one main portion are displayed.

32. The data processing system of claim 31 wherein the synoptic representation displayed in the tab portion of a respective notebook page is user selectable.

33. The data processing system of claim 31 further comprising:

circuitry for detecting a command to close the notebook; and circuitry for presenting the notebook in iconized form to represent a web browsing session.

34. The data processing system of claim 31 further comprising:

circuitry for detecting a mouse event selecting a tab portion of the notebook; and circuitry for retrieving a web page associated with the selected tab portion.

35. The data processing system of claim 31 wherein the ordering rule is related to a sequence in which the web pages are browsed in the web browsing session.

36. The data processing system of claim 31 further comprising circuitry for importing a notebook page from another notebook representing a different web browsing session.

37. The data processing system of claim 31 further comprising circuitry for sequentially activating the tab portions of the notebook page so that a prior web browsing session is presented without retrieving the web page content with a new set of requests to web servers.

38. The data processing system of claim 31 further comprising circuitry for scrolling the main portion of a notebook page in response to user input.

39. The data processing system of claim 31 wherein a set of subject-related notebooks are created, each containing a set of web pages for a particular subject.

40. A program product in a computer readable medium for generating a browsing history said program product comprising:

programming for each web page browsed, creating a notebook page for inclusion in a notebook data structure, wherein a main portion of the notebook page contains content from the web page and a tab portion of the notebook page contains a synoptic representation of the web page contents;

programming for ordering the created notebook pages according to an ordering rule based on the web browsing history; and programming for presenting a notebook for a web browsing session wherein a plurality of tab portions and at least one main portion are displayed.

41. The program product in a computer readable medium of claim 40 wherein the summary displayed the synoptic representation displayed in the tab portion of a respective notebook page is user selectable.

42. The program product in a computer readable medium of claim 40 further comprising:

programming for detecting a command to close the notebook; and programming for presenting the notebook in iconized form to represent a web browsing session.

43. The program product in a computer readable medium of claim 40 further comprising:

programming for detecting a mouse event selecting a tab portion of the notebook; and programming for retrieving a web page associated with the selected tab portion.

44. The program product in a computer readable medium of claim 40 wherein the ordering rule is related to a sequence in which the web pages are browsed in the web browsing session.

45. The program product in a computer readable medium of claim 40 further comprising programming for importing a notebook page from another notebook representing a different web browsing session.

46. The program product in a computer readable medium of claim 40 further comprising programing for sequentially activating the tab portions of the notebook page so that a prior web browsing session is presented without retrieving the web page content with a new set of requests to web servers.

47. The program product in a computer readable medium of claim 40 further comprising programming for scrolling the main portion of a notebook page in response to user input.

48. The program product in a computer readable medium of claim 40 wherein a set of subject related notebooks are created, each containing a set of web pages for a particular subject.

* * * * *

UNITED STATES PATENT AND TRADEMARK OFFICE
CERTIFICATE OF CORRECTION

PATENT NO. : 6,310,630 B1  Page 1 of 1
DATED : October 30, 2001
INVENTOR(S) : Salil Janardan Kulkarni and Merle Douglas Sterling It is certified that error appears in the above-identified patent and that said Letters Patent is hereby corrected as shown below:

Column 9,
Line 46, "curt" should be -- current --.

Column 11,
Line 5, "programing" should be -- programming --.

Column 12,
Line 7, "ionized" should be -- iconized --.

Column 14,
Line 20, "programing" should be -- programming --.

Signed and Sealed this

Seventh Day of May, 2002

Attest:

Attesting Officer

JAMES E. ROGAN
Director of the United States Patent and Trademark Office